United States Patent [19]

Minomiya et al.

[11] Patent Number: 4,952,639

[45] Date of Patent: Aug. 28, 1990

[54] NOVEL HYDROGENATED PETROLEUM RESIN AND PROCESS FOR PREPARING THE SAME

[75] Inventors: Katsumi Minomiya, Ichihara; Akira Takahashi, Sugito; Koichi Murakami, Chiba, all of Japan

[73] Assignee: Maruzen Petrochemical Co., Ltd., Tokyo, Japan

[21] Appl. No.: 206,358

[22] Filed: Jun. 14, 1988

[30] Foreign Application Priority Data

Jul. 30, 1987 [JP] Japan .................................. 62-188980

[51] Int. Cl.$^5$ ................................................ C08F 8/04
[52] U.S. Cl. ............................ 525/327.9; 525/332.8; 525/332.9; 525/338; 525/339; 526/339
[58] Field of Search ............... 525/332.8, 327.9, 332.9; 526/339

[56] References Cited

U.S. PATENT DOCUMENTS

| | | |
|---|---|---|
| 3,639,366 | 2/1972 | Broca et al. |
| 4,037,016 | 7/1977 | Habeck et al. ...................... 526/339 |
| 4,038,346 | 7/1977 | Feeney ................................. 526/339 |
| 4,060,503 | 11/1977 | Feeney et al. ...................... 526/339 |
| 4,714,749 | 12/1987 | Hughes et al. ................... 525/332.8 |

FOREIGN PATENT DOCUMENTS 457307 of 0000 Japan .
475813 of 0000 Japan .
4520302 of 0000 Japan .

*Primary Examiner*—Bernard Lipman
*Attorney, Agent, or Firm*—Oblon, Spivak, McClelland, Maier & Neustadt

[57] ABSTRACT

A hydrogenated petroleum resin is provided, which features excellent heat stability and good compatibility with polar polymers. The resin provides an adhesive compound in combination with such a polar polymer, exhibiting an outstanding adhesion capability. The resin is prepared by copolymerization of a $C_5$ fraction, containing diolefins and monoolefins in a specific proportion, and an aromatic monoolefin, followed by a proper degree of hydrogenation of the copolymer.

2 Claims, No Drawings

NOVEL HYDROGENATED PETROLEUM RESIN AND PROCESS FOR PREPARING THE SAME

BACKGROUND OF THE INVENTION

1. Field of the Invention:

This invention relates to a hydrogenated petroleum resin and the process for preparing the same. More particularly, the invention is directed to a hydrogenated petroleum resin which is suitably used as a tackifier The resin is prepared by first cationically polymerizing a mixture of an aliphatic hydrocarbon fraction comprising piperylene, isoprene, and monoolefins, and an aromatic monoolefin using a Friedel Crafts catalyst to produce a precursor copolymer petroleum resin, and then hydrogenating this precursor copolymer petroleum resin to substantially saturate unsaturated bonds derived from the aliphatic di-and monoolefins, but leaving a certain proportion of aromatic nuclei unhydrogenated.

2. Description of the Background:

Conventionally, rosin-type or terpene-type resins which are derived from naturally occurring materials have widely been used as tackifiers in adhesion technologies such as pressure-sensitive adhesion and hot-melt adhesion. These materials, however, are not stably available nor free from price fluctuation. Because of these reasons, increased attention is being given to petroleum hydrocarbon resins. Recent developments in adhesion technology as well as diversified use of adhesives, however, is demanding more sophisticated performance of the tackifing resins. Examples of such performance include excellent heat stability and weather resistance under severer conditions, and better compatibility with polar polymers such as ethylene-vinyl acetate copolymer (EVA), SBR, styrene-type thermoplastic elastomer, and the like. Other requirements are providing an attractive color for a better appearance of the product and a more pleasant odor during handling.

In order to satisfy these diverse requirements assessed on the adhesive compounds, attempts have been undertaken to develop hydrogenated petroleum resins by hydrogenating conventional petroleum resins. Hydrogenating aliphatic hydrocarbon resins for improving their heat stability is known in the art (U.S. Pat. No. 2,824,860). Even though some degree of improvement over the precursor petroleum resins before hydrogenation has been realized in these known hydrogenated petroleum resins in terms of color, odor, or heat stability, their performance qualities such as adequate heat stability, compatibility with polar polymers, or the like, are yet to be improved to satisfy the recent demand in the adhesives industries. Specifically, there are conventionally known hydrogenated petroleum resins exhibiting either excellent heat stability or compatibility with polar polymers, but none of them possess these two required characteristics at the same time.

In view of this situation, the present inventors have conducted extensive studies to improve these defects in the conventional hydrogenated petroleum resins, and to obtain an odorless and transparent hydrogenated petroleum resin which possesses both of the two essential requirements, i.e., excellent heat stability and compatibility with polar polymers.

The problem in the conventional hydrogenated petroleum resins with respect to the poor heat stability or insufficient compatibility with polar polymers is considered to be caused by improper selection of raw material hydrocarbon fractions which ultimately constitute the hydrogenated petroleum resins. In line with this presumption, a number of combinations of a variety of petroleum hydrocarbon fractions were studied. As a result, a certain combination of a $C_5$ fraction, containing diolefins and monoolefins in a specific proportion and an aromatic monoolefin, was found to give an optimum construction of a polymer resin. It was further found that the polymer resin thus obtained, when properly hydrogenated, produces an ideal petroleum resin which satisfies both of the requirements of heat stability and compatibility with polar polymers. Such findings have led to the completion of this invention.

SUMMARY OF THE INVENTION

Accordingly, an object of this invention is to provide a hydrogenated petroleum resin comprising, as its polymer chain major constituents, (I) 25–72% by weight of $C_5$ diolefin moieties, (II) 10–45% by weight of $C_5$ monoolefin moieties, and (III) 10–50% by weight of aromatic monoolefin moieties, wherein the ratio by weight of (I)/(II) is in the 1/1–4/1 range, at least 80% of unsaturated bonds derived from (I) and (II) are hydrogenated, up to 80% of aromatic nuclei derived from (III) are hydrogenated, and at least 10% by weight of moieties constituting the polymer chain are comprised of component (III) with its aromatic nucleus being unhydrogenated.

Another object of this invention is to provide a hydrogenated petroleum resin having excellent heat stability and good compatibility with polar polymers.

Still another object of this invention is to provide a process for preparing such a hydrogenated petroleum resin which comprises: copolymerizing (i) 95–70 parts by weight of hydrocarbons having a boiling point range of $-10°$–$100°$ C., which are derived from fractions by-produced in a petroleum refining or thermal cracking process and comprise 15–35% by weight of $C_5$ diolefins and 15–35% by weight of $C_5$ monoolefins, with the remaining portion being predominantly comprised of paraffins; and (ii) 5–30 parts by weight of aromatic monoolefins, in the presence of a Friedel Crafts catalyst to produce a copolymer resin, and hydrogenating said copolymer resin by contacting the same with hydrogen in the presence of a hydrogenating catalyst at a temperature in the normal-to-250° C. range.

Other objects, features and advantages of the invention will hereinafter become more readily apparent from the following description.

DETAILED DESCRIPTION OF THE INVENTION AND PREFERRED EMBODIMENTS

The term "compatibility" of a resin as used in this specification in relation to a polar resin means the characteristic of the first-mentioned resin to form a homogeneous and transparent mixture when melted together with said polar resin. The degree of the compatibility can usually be indicated by Cloud Point (°C.)

In the following, the process for preparing the hydrogenated petroleum resin according to the present invention is described in detail.

The first of the raw materials used in this invention is a $C_5$ fraction obtained as a by-product of a petroleum refining or thermal cracking process and has a boiling point range of $-10°$–$100°$ C. This $C_5$ fraction may be that with a reduced cyclopentadiene content or even with substantially no cyclopentadiene content. A spent C5 fraction obtained after extraction of commercially valuable isoprene can also be used as the C5 fraction raw material of this invention. These C5 fractions can be used either independently as they are or mixed with other fractions. If required, the composition of a C5 fraction or mixture of C5 fractions is adjusted by processing them by distillation or otherwise, so that the raw material contains 15-35% by weight of C5 diolefins such as piperylene, isoprene, cyclopentadiene, and the like, 15-35% by weight of C5 monoolefins such as 2-methyl-1-butene, 2-methyl-2-butene, cyclopentene, and the like, and 70-30% by weight of paraffins such as i-pentane, n-pentane, and the like. A diolefin or monoolefin content in excess of the above range tends to cause gel formation during the polymerization reaction or may involve difficulties in eliminating the heat of the reaction. Conversely, a diolefin or monoolefin content lower than the above range results in a lower resin yield and a dropped softening point of the resin.

A mixture of 95-70 parts by weight of this first raw material and 5-30 parts by weight of an aromatic monoolefin, the second raw material, constitutes the polymerizing raw material of this invention. Styrene, which is readily available in the industry, is preferably used as a second raw material. This second raw material, however, is not necessarily limited to styrene. Other aromatic monoolefins such as $\alpha$-methyl styrene, vinyl toluene, indene, and the like are also employed. These second raw materials can be used either independently or in mixture. C9 fractions having a boiling point ranging from 140°-280° C., which are obtained as by-products of petroleum refining or thermal cracking processes and contain 15-40 wt % of aromatic monoolefins can also be used as aromatic monoolefin raw materials. These C9 fractions are used in such an amount that the aromatic monoolefins content in the total raw materials be in the above 5-30 parts by weight range.

If the proportion of the aromatic monoolefins in the polymerizing raw materials is less than 5 parts by weight, the resulting resin exhibits only poor compatibility with polar polymers. A proportion of more than 30 parts by weight, on the other hand, impairs the heat stability of the resin produced.

The above raw materials are cationically polymerized in the presence of a Friedel Crafts catalyst at a temperature of 60°-140° C., and preferably 70°-120° C., to produce a copolymer which is a precursor of the hydrogenated petroleum resin of this invention.

As a Friedel Crafts catalyst, an aluminum halide may be used as is or as a complex. A particularly preferable catalyst is that described in Japanese Patent Publication No. 39645/1982, i.e., a catalyst which is comprised of a fatty acid ester and a halogenated aluminum at a fatty acid ester/aluminum halide molar ratio of 1/1.5-1/6. The desired copolymer which is a precursor of the hydrogenated petroleum resin of this invention can be efficiently produced by employing this catalyst at a proportion of 0.5-2% by weight based on the total weight of the raw materials, and by carrying out the reaction at a temperature of from 70° to 120° C.

Since the polymerization reaction is normally exothermic, it is usually carried out in the presence of a solvent so as to properly control the reaction rate and to prevent gel formation. In cases where there is no technical problems due to the reaction heat or gel formation, however, the reaction can be carried out in the absence of a solvent. Aliphatic hydrocarbons such as pentane, hexane, heptane, and cyclohexane; aromatic hydrocarbons such as benzene, toluene, ethylbenzene, and xylene; and halogenated hydrocarbons such as methylene chloride and the like are used as a solvent either independently or mixed with one or more others. A preferred solvent is an aromatic hydrocarbon. There is no specific restriction as to the type of polymerization reaction employed. It may be carried out either batchwise, semi-batchwise, or continuously.

The composition of the copolymer resin, which is a precursor material of the hydrogenated petroleum resin of this invention, can be indirectly determined through gas chromatography analysis of the feed oils and the oil remaining unreacted after completion of the reaction. In order to provide the desired hydrogenated petroleum resin of this invention, it is imperative that this precursor resin have a composition of (I) 25-72% by weight of C5 diolefin moieties, (II) 10-45% by weight of C5 monoolefin moieties, and (III) 10-50% by weight of aromatic monoolefin moieties, wherein the ratio by weight of (I)/(II) be in the 1/1-4/1 range.

The hydrogenated petroleum resin of this invention can be prepared by hydrogenating the precursor resin having a composition falling within the defined range. The hydrogenation can be carried out according to a conventional method. For instance, it can be performed by dissolving the precursor resin into a solvent such as hexane, heptane octane, cyclohexane, methyl cyclohexane, benzene, toluene, xylene, or the like, or into a mixture of two or more of these solvents, or melting the resin without using a solvent, and by submitting this dissolved or melted resin to hydrogenation conditions of a temperature of from normal to 350° C. and a hydrogen pressure of from normal to 350 kg/cm$^2$, in the presence of a metallic catalyst such as nickel, palladium, platinum, cobalt, ruthenium, rhodium, or the like, or an oxide of these metals.

Hydrogenation conditions of a temperature in the normal-to-250° C. range and pressure in the normal-to-150 kg/cm$^2$ range are preferred to efficiently obtain the desired hydrogenated petroleum resin. Either a batch-type or continuous-type reaction system can be employed for the hydrogenation reaction without any special limitation. In the hydrogenated petroleum resin thus prepared, almost all, specifically 80 to 100%, of the unsaturated bonds derived from C5 di- or monoolefins which were contained in the precursor resin are hydrogenated. On the other hand, aromatic nuclei in the hydrogenated petroleum resin, which are derived from the raw material aromatic monoolefins and contained in the precursor resin, are hydrogenated up to 80%, with at least 10% thereof constituting the polymer chain remaining unhydrogenated. The hydrogenated petroleum resin has a number average molecular weight of 700-1,500, a softening point of 70°-120° C., an iodine value of not more than 100, and a Gardner color of below 1.

In this invention, the degree of hydrogenation of the unsaturated bonds contained in the resin polymer chain derived from diolefin or monoolefin moieties is measured by infrared absorption spectrum, and the unit amounts of aromatic monoolefins are determined by 1H-NMR spectrum. The number average molecular weight of the resin is determined according to G.P.C. analysis using polystyrene as a standard. Determinations of the softening point, iodine value, and color are performed based on JIS-K-2207-1980 (Ring and Ball method), JIS-K-0070-1966, and ASTM D-1544-58T (Gardner color), respectively.

The hydrogenated petroleum resin of this invention features both excellent heat stability and good compatibility with polar polymers superior to those in conventional hydrogenated resins. Because of this, the hydrogenated petroleum resin can be directed to almost all applications in the adhesives industry field, especially to those products requiring a transparent or white appearance, or a high degree of heat stability, weather resistance, or odorlessness. In addition, the hydrogenated petroleum resin exhibits an outstanding adhesion capability when used as an adhesive together with a substrate natural rubber as well as polar polymers such as EVA, SBR, styrene-isoprene-styrene block copolymer (SIS), styrene-ethylene-butylene-styrene block copolymer (SEBS), styrene-butylene-styrene block copolymer (SBS), or the like.

As mentioned earlier, the hydrogenated petroleum resin prepared according to this invention can be easily prepared on a commercial scale from readily available raw materials. The hydrogenated petroleum resin offers both excellent heat stability and good compatibility with polar polymers, and can provide high-quality adhesive compounds when used in place of conventionally utilized tackifing resins.

Other features of the invention will become apparent in the course of the following description of the exemplary embodiments which are given for illustration of the invention and are not intended to be limiting thereof.

EXAMPLE

Example 1 Preparation of Precursor Resins

A catalyst was prepared by mixing and heating 2.0 gm (15.4 m mol) of aluminum chloride and 0.67 gm (8.9 m mol) of methyl acetate. The catalyst thus prepared was charged into a 1 liter glass autoclave equipped with a stirrer, thermometer, pressure gauge, and dropping funnel, and diluted with 30 ml of benzene. To this catalyst 200 gm of a mixture of a $C_5$ fraction listed in Table 1, and styrene with a proportion as shown in Table 2, were slowly added dropwise through the dropping funnel over 30 minutes while maintaining the temperature in the autoclave at 90° C.

After all the raw materials were charged into the autoclave, the stirring was continued for an additional 1 hour at 90° C. to complete the reaction, whereupon an alkali was added to decompose the catalyst. The decomposed catalyst was removed by washing with water. The unreacted raw materials and benzene were then distilled off at normal pressure from the polymerized product, and subsequently distilled in a vacuum to eliminate low-polymerized materials, thus obtaining a copolymer which is the precursor resin of the hydrogenated petroleum resin of this invention.

The percentage of reacted diolefins, monoolefins, and styrene were determined based on gas chromatography analysis of the unreacted oil, from which results the resin compositions were calculated. The styrene content was also calculated from the $^1$H-NMR spectrum. The polymerization conditions, and the yields and compositions of copolymer resins produced are listed in Table 2.

TABLE 1

| $C_5$ Frection Component | $C_5$ Fraction Composition | | |
|---|---|---|---|
| | Composition (wt %) | | |
| | (1) | (2) | (3) |
| i-pentane | 7.1 | 10.2 | 11.8 |
| n-pentane | 34.8 | 39.4 | 34.4 |
| 2,2-dimethylbutane | 0.4 | 0.3 | 0.1 |
| 1-pentene | 2.3 | 2.9 | 4.4 |
| 2-methyl-1-butene | 4.0 | 4.7 | 6.7 |
| 1,4-pentadiene | 0.4 | 0.4 | 1.0 |
| t-2-pentene | 3.1 | 2.9 | 3.5 |
| c-2-pentene | 2.0 | 1.8 | 2.0 |
| 2,3-dimethylbutane | 0.2 | 0.1 | — |
| 2-methyl-2-butene | 5.0 | 4.1 | 3.7 |
| 2-methylpentane | 3.0 | 1.5 | 0.2 |
| isoprene | 0.5 | 7.8 | 16.9 |
| 3-methylpentane | 1.2 | 0.5 | 0.1 |
| cyclopentane | 3.9 | 2.4 | 1.2 |
| t-1,3-piperylene | 13.2 | 9.3 | 6.4 |
| c-1,3-piperylene | 8.7 | 5.6 | 3.3 |
| cyclopentene | 7.2 | 4.8 | 2.7 |
| cyclopentadiene | 0.3 | 0.4 | 0.8 |
| $C_6$ and unidentified compounds | 2.7 | 1.1 | 0.8 |

TABLE 2

Copolymerization Conditions and Characteristics of Copolymer Resins

| Copolymer Resin | A | B | C | D |
|---|---|---|---|---|
| Raw Materials | | | | |
| $C_5$ Fraction Composition | (1) | (1) | (2) | (3) |
| Amount of $C_5$ Fraction (gm) | 200 | 190 | 170 | 150 |
| Amount of Styrene (gm) | 0 | 10 | 30 | 50 |
| Polymerization Conditions | | | | |
| Temperature (°C.) | 90 | 90 | 90 | 90 |
| Catalyst (wt %) | 1.5 | 1.5 | 1.5 | 1.5 |
| Copolymer Resin | | | | |
| Yield (wt %) | 28.3 | 32.4 | 41.2 | 47.1 |
| Softening Point (°C.) | 103 | 98 | 94 | 92 |
| Iodine Value (gm/100 gm) | 160 | 150 | 140 | 130 |
| Color (Gardner Color) | 7 | 6 | 6 | 5 |
| Resin Composition (wt %) | | | | |
| 1-pentene | 1.7 | 1.5 | 1.5 | 1.7 |
| 2-methyl-1-butene | 10.3 | 8.8 | 8.6 | 9.0 |
| t-2-pentene | 1.7 | 1.5 | 1.1 | 0.9 |
| c-2-pentene | 2.0 | 1.8 | 1.3 | 0.9 |
| 2-methyl-2-butene | 12.5 | 11.1 | 7.4 | 5.1 |
| isoprene | 1.4 | 1.3 | 15.0 | 25.1 |
| t-1,3-piperylene | 36.6 | 31.3 | 18.4 | 9.3 |
| c-1,3-piperylene | 22.8 | 20.2 | 10.5 | 5.1 |
| cyclopentene | 10.1 | 9.1 | 4.7 | 2.1 |
| cyclopentadiene | 0.8 | 0.8 | 0.8 | 1.3 |
| styrene | 0 | 12.6 | 30.7 | 39.5 |
| | | *(11.8) | (31.5) | (40.2) |
| Total $C_5$ Diolefins | 61.6 | 53.6 | 44.7 | 40.8 |
| Total $C_5$ Monoolefins | 38.4 | 33.8 | 24.6 | 19.7 |
| Total $C_5$ Diolefins/ Total $C_5$ Monoolefins | 1.6 | 1.6 | 1.8 | 2.1 |

*Figures in parentheses indicate values calculated based on $^1$H-NMR spectrum analysis.

Example 2 Hydrogenation of Precursor Resin

To an autoclave was charged 250 parts by weight of a copolymer resin prepared in Example 1, 250 parts by weight of cyclohexane, and 7.5 parts by weight of a hydrogenating catalyst (nickel/diatomaceous earth; nickel content: 50%). Hydrogenation of the copolymer was carried out under the conditions listed in Table 3. Upon completion of hydrogenation, the catalyst and solvent were removed from the reaction mixture to obtain a hydrogenated petroleum resin. Characteristics of the resins prepared and the hydrogenation degree of the components in each resin are listed also in Table 3.

TABLE 3

Hydrogenation Conditions and Characteristics of Hydrogenated Resins

| Hydrogenated Resin | Invented Resins | | | Comparative Resins | | |
|---|---|---|---|---|---|---|
| | H-1 | H-2 | H-3 | H-4 | H-5 | H-6 |
| Precursor Copolymer | B | C | D | A | C | C |
| Hydrogenation Conditions | | | | | | |
| Hydrogen Pressure (kg/cm$^2$) | 60 | 60 | 60 | 60 | 60 | 60 |
| Temperature (°C.) | 210 | 210 | 210 | 210 | 180 | 230 |
| Reaction Time (hour) | 2 | 3 | 3 | 2 | 2 | 6 |
| Characteristics | | | | | | |
| Number Average Molecular Weight | 1050 | 950 | 980 | 1100 | 950 | 910 |
| Softening Point (°C.) | 97 | 94 | 91 | 102 | 94 | 92 |
| Iodine Value (gm/100 gm) | 58 | 55 | 50 | 60 | 100 | 50 |
| Color (Gardner Color) | <1 | <1 | <1 | <1 | 2 | <1 |
| Degree of Hydrogenation | | | | | | |
| C$_5$ Unsaturated Bonds (%) | 99 | 98 | 95 | 100 | 60 | 100 |
| Styrene Aromatic Nucleus (%) | 10 | 20 | 30 | — | 5 | 90 |

Example 3 Preparation of Hot Melt Adhesives

In order to confirm the heat stability and compatibility with polar resins, hot-melt adhesive compounds were prepared using the hydrogenated petroleum resins prepared in Example 2, and EVA, as a substrate material, according to the following formulation:

| | |
|---|---|
| EVA (EVAFLEX No. 220, manufactured by Mitsui Polychemical Co., Ltd.) | 100 parts by weight |
| Paraffin Wax (60–62° C.) | 50 parts by weight |
| Hydrogenated Petroleum Resin | 100 parts by weight |

The invented and comparative products in Table 3 were used as the hydrogenated petroleum resins in this Example. For further comparison, commercially available aromatic-type hydrogenated resins, a completely hydrogenated product (Arkon P-100), and incompletely hydrogenated product (Arkon M-100), were also used. The results are shown in Table 4. Adhesion properties of the tested adhesive compounds were measured according to the following method:

Cloud Point: JIS-K-2269

Heat Stability: A tested adhesive compound weighing 30 gm was taken into a 100-ml beaker, which was then covered with aluminum foil and left in a hot oven at a temperature of 180° C. The time period (hour) required for the surface of the adhesive compound to get skinned was taken as the heat stability.

Al/Al Adhesion Capability: Tested compound films of a 100-μ thickness were provided onto an aluminum plate by applicator which were subsequently spread on a hot plate. Onto this aluminum plate were placed another aluminum plate, and heat sealed at a temperature of 160° C. and loading of 1 kg/cm$^2$ for 2 seconds. The tested specimen was then cut into 25-mm-width strips and submitted to T-peel testing at 300 mm/min using a tension tester.

TABLE 4

Adhesion Properties

| Hydrogenated Resin | Cloud Point (°C.) | Heat Stability (180° C. × hour) | Al/Al Adhesion (gf/25 mm) |
|---|---|---|---|
| Resin Using Invented Product | | | |
| H-1 | 72 | 100< | 670 |
| H-2 | 68 | 100< | 750 |
| H-3 | 65 | 100< | 810 |
| Resin Using Comparative Product | | | |
| H-4 | 95 | 100< | 150 |
| H-5 | 67 | 50 | 770 |
| H-6 | 91 | 100< | 210 |
| Resin Using Commercial Product | | | |
| Arkon P-100* | 110 | 75 | 130 |
| Arkon M-100* | 65 | 50 | 350 |

*Arkon P-100 and Arkon M-100 are prepared by hydogenating aromatic hydrocarbon resins obtained by cationically polymerizing C$_9$ fractions with boiling point ranges of 140–280° C. and which are substantially free from C$_5$ fractions. The degrees of the hydrogenation are complete in Arkon P-100, i.e. all of aromatic neuclei are hydrogenated, and incomplete in Arkon M-100, with the hydrogenation degree being 50–80%.

As is clear from the above results, the adhesive compounds using the hydrogenated petroleum resin of this invention demonstrated excellent heat stability and adhesion performance.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A hydrogenated petroleum resin comprising, as its polymer chain major constituents, (I) 25–75% by weight of C$_5$ diolefin, (II) 10–45% by weight of C$_5$ monoolefin moieties and (III) 10–50% by weight of aromatic monoolefin moieties selected from the group consisting of styrene, -methylstyrene, vinyl toluene and indene, wherein the ratio by weight of (I)/(II) is in the 1/1–4/1 range, at least 80% of unsaturated bonds derived from (I) and (II) are hydrogenated, up to 80% of aromatic nuclei derived from (III) are hydrogenated, and at least 10% by weight of moieties constituting the polymer chain are comprised of component (III) with its aromatic nucleus being unhydrogenated.

2. The hydrogenated petroleum resin according to claim 1, wherein said hydrogenated petroleum resin has a number average molecular weight of 700–1,500, a softening point of 70°–120° C., an iodine value of not more than 100, and a Gardner color of below 1.

* * * * *